US009679087B2

(12) United States Patent
Hamann et al.

(10) Patent No.: US 9,679,087 B2
(45) Date of Patent: Jun. 13, 2017

(54) TECHNIQUES FOR EVALUATING OPTIMUM DATA CENTER OPERATION

(75) Inventors: Hendrik F. Hamann, Yorktown Heights, NY (US); Sergio Adolfo Bermudez Rodriguez, Croton on Hudson, NY (US); Hans-Dieter Wehle, Talheim (DE)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 13/612,059

(22) Filed: Sep. 12, 2012

(65) Prior Publication Data

US 2014/0074444 A1   Mar. 13, 2014

(51) Int. Cl.
G06F 17/50   (2006.01)

(52) U.S. Cl.
CPC .......... G06F 17/5004 (2013.01); G06F 17/50 (2013.01); G06F 2217/78 (2013.01)

(58) Field of Classification Search
None
See application file for complete search history.

(56) References Cited

U.S. PATENT DOCUMENTS

| 8,001,403 | B2 | 8/2011 | Hamilton et al. |
| 8,020,390 | B2 | 9/2011 | Hamann et al. |
| 8,209,413 | B1* | 6/2012 | Turrichi et al. ............... 709/224 |
| 2007/0038414 | A1* | 2/2007 | Rasmussen et al. ............... 703/1 |
| 2008/0288193 | A1 | 11/2008 | Claassen et al. |
| 2009/0228893 | A1* | 9/2009 | Behrendt et al. ............. 718/105 |
| 2009/0326879 | A1 | 12/2009 | Hamann et al. |
| 2010/0049494 | A1 | 2/2010 | Radibratovic et al. |
| 2010/0076607 | A1* | 3/2010 | Ahmed et al. ................. 700/276 |
| 2010/0131109 | A1* | 5/2010 | Rasmussen et al. .......... 700/277 |
| 2011/0040532 | A1 | 2/2011 | Hamann et al. |
| 2011/0077795 | A1* | 3/2011 | VanGilder et al. ........... 700/300 |
| 2012/0245738 | A1* | 9/2012 | Allen-Ware et al. ......... 700/276 |
| 2012/0290135 | A1* | 11/2012 | Bentivegna et al. ......... 700/276 |
| 2013/0042639 | A1* | 2/2013 | Kobayashi et al. ............ 62/186 |
| 2013/0103218 | A1* | 4/2013 | Das et al. ...................... 700/291 |
| 2013/0264045 | A1* | 10/2013 | Chainer et al. ............... 165/287 |
| 2013/0317785 | A1* | 11/2013 | Chainer et al. ................... 703/1 |
| 2013/0340995 | A1* | 12/2013 | David et al. .................. 165/287 |
| 2014/0049905 | A1* | 2/2014 | Manzer .................... 361/679.46 |

OTHER PUBLICATIONS

R. Das, J. O. Kephart, J. Lenchner, H. Hamann, Utility-function driven energy efficient cooling in data centers, International Conference on Autonomic Computing (ICAC), Washington, DC, pp. 61-70, Jun. 2010.*

(Continued)

*Primary Examiner* — Omar Fernandez Rivas
*Assistant Examiner* — Robert Brock
(74) *Attorney, Agent, or Firm* — Vazken Alexanian; Michael J. Chang, LLC

(57) ABSTRACT

Techniques for modeling a data center are provided. In one aspect, a method for determining data center efficiency is provided. The method includes the following steps. Target parameters for the data center are obtained. Technology pre-requisite parameters for the data center are obtained. An optimum data center efficiency is determined given the target parameters for the data center and the technology pre-requisite parameters for the data center.

19 Claims, 5 Drawing Sheets

(56) References Cited

OTHER PUBLICATIONS

Wei Huang; Allen-Ware, M.; Carter, J.B.; Elnozahy, E.; Hamann, H.; Keller, T.; Lefurgy, C.; Jian Li; Rajamani, K.; Rubio, J., "TAPO: Thermal-aware power optimization techniques for servers and data centers," Green Computing Conference and Workshops (IGCC), 2011 International , vol. No., pp. 1-8, Jul. 25-28, 2011.*

Das, R.; Yarlanki, S.; Hamann, H.; Kephart, J.O.; Lopez, V., "A unified approach to coordinated energy-management in data centers," Network and Service Management (CNSM), 2011 7th International Conference on , vol. No., pp. 1-5, Oct. 24-28, 2011.*

H.F. Hamann et al., "Methods and Techniques for Measuring and Improving Data Center Best Practices," Proceeding of 11th ITHERM, pp. 1146-1152 (2008).

H.F. Hamann et al., "Uncovering energy-efficiency opportunities in data centers," IBM Journal of Research and Development, vol. 53, Issue:3, May 2009, pp. 10:1-10:12.

J.G. Koomey, Estimating Total Power Consumption by Servers in the U.S. and the World, A report by the Lawrence Berkeley National Laboratory, Feb. 15, 2007 (31 total pages).

"EPA Report to Congress on Server and Data Center Energy Efficiency" Public Law 109-431, United States Code, pp. 1-13, Aug. 2, 2007.

C. Belady et al., "Green grid data center power efficiency metrics: PUE and DCIE," Green Grid White Paper #6, pp. 1-9 (2008).

ASHRAE TC 9.9 2011 Thermal Guidelines for Data Processing Environments—Expanded Data Center Classes and Usage Guidance Whitepaper prepared by ASHRAE Technical Committee (TC) 9.9, pp. 1-45.

"Wet-Bulb Temperature and Relative Humidity from Air Temperature and Dewpoint Temperature" available from the National Weather Service—Western Region Headquarters (2 total pages).

2012 Best Practices for the EU Code of Conduct on Data Centres, version 3.0.8, pp. 1-53, Dec. 15, 2011.

L. Li et al., "ThermoCast: A Cyber-Physical Forecasting Model for Data Centers," KDD 2011: 17th ACM SIGKDD, Conference on Knowledge Discovery and Data Mining, Aug. 21-24, 2011 (9 total pages).

V. Lopez et al., "Measurement-based modeling for data centers," 12th IEEE Intersociety Conference on Thermal and Thermomechanical Phenomena in Electronic Systems (ITherm), Jun. 2-5, 2010 (8 total pages).

* cited by examiner

FIG. 4

REAL-TIME VALUES:

|  | WET BULB TEMPERATURE | PIT [kW] | Pmis [kW] | # OF REQUIRED ACUs |
|---|---|---|---|---|
| JAN | 47.5 | 1000 | 3 | 14 |
| FEB | 48.9 | 1023 | 4 | 14 |
| MAR | 49.7 | 1047 | 10 | 15 |
| APR | 50 | 1018 | 20 | 14 |
| MAY | 53.2 | 997 | 12 | 14 |
| JUN | 55 | 992 | 12 | 14 |
| JUL | 57 | 1100 | 12 | 15 |
| AUG | 58 | 1023 | 0 | 14 |
| SEP | 57.5 | 1100 | 12 | 15 |
| OCT | 54.6 | 1121 | 12 | 16 |
| NOV | 51.8 | 1102 | 2 | 15 |
| DEC | 48 | 1098 | 3 | 15 |

EXAMPLE RESULTS:

|  | # OF REQUIRED ACUs | PHL [kW] | CHILLER UTILIZATION | Pchill [kW] | PDC [kW] | DCIE |
|---|---|---|---|---|---|---|
| JAN | 14 | 1209 | 0 | 60 | 1369 | 0.88 |
| FEB | 14 | 1235.15 | 0 | 62 | 1399 | 0.88 |
| MAR | 15 | 1280.6 | 0 | 64 | 1449 | 0.88 |
| APR | 14 | 1261.9 | 1 | 258 | 1622 | 0.78 |
| MAY | 14 | 1223.85 | 1 | 261 | 1584 | 0.77 |
| JUN | 14 | 1218.6 | 1 | 266 | 1584 | 0.77 |
| JUL | 15 | 1340.25 | 1 | 300 | 1751 | 0.77 |
| AUG | 14 | 1227.15 | 1 | 279 | 1608 | 0.76 |
| SEP | 15 | 1340.25 | 1 | 303 | 1753 | 0.76 |
| OCT | 16 | 1370.55 | 1 | 297 | 1780 | 0.77 |
| NOV | 15 | 1322.35 | 1 | 277 | 1709 | 0.77 |
| DEC | 15 | 1320.15 | 0 | 66 | 1496 | 0.88 |

TECHNIQUES FOR EVALUATING OPTIMUM DATA CENTER OPERATION

STATEMENT OF GOVERNMENT RIGHTS

This invention was made with Government support under Contract number DE-EE00002897 awarded by Department of Energy. The Government has certain rights in this invention.

FIELD OF THE INVENTION

The present invention relates to data centers, and more particularly, to techniques for assessing data center efficiency to achieve optimum data center efficiency and operation.

BACKGROUND OF THE INVENTION

The energy consumption of data centers (DCs) has dramatically increased in recent years, primarily because of the massive computing demands driven essentially by every sector of the economy, ranging from accelerating online sales in the retail business to banking services in the financial industry. A study estimated the total U.S. DC energy consumption in the year 2005 to be approximately 1.2% of the total U.S. consumption (up by 15% from the year 2000). See, for example, J. G. Koomey, "Estimating Total Power Consumption by Servers in the U.S. and the World, A report by the Lawrence Berkeley National Laboratory, Feb. 15, 2007; and "EPA Report to Congress on Server and Data Center Energy Efficiency" Public Law 109-431, United States Code, Aug. 2, 2007.

In an effort to improve data center energy efficiency the Green Grid Organization has introduced metrics, which assist data center operators in gauging the energy efficiency of the facility. For example, the Data Center Infrastructure Efficiency (DCIE) metric is defined as the ratio between the energy consumption for all IT equipment of the DC facility and the total DC energy usage. An equivalent metric is the one called the Power Usage Effectiveness (PUE) (with PUE=1/DCIE). The DCIE or PUE metric are today widely used by DC operators. The DCIE and PUE metrics are described, for example, in C. Belady et al., "Green grid data center power efficiency metrics: PUE and DCIE," Green Grid White Paper #6 (2008), the contents of which are incorporated by reference herein.

While it is important to measure data center energy efficiency, techniques for determining what DCIE or PUE value is actually achievable would be useful given the fact that each data center is different with very different requirements (different business requirements, IT equipment mix, geographical locations, technology pre-requisites, etc.).

SUMMARY OF THE INVENTION

The present invention provides techniques for modeling a data center. In one aspect of the invention, a method for determining data center efficiency is provided. The method includes the following steps. Target parameters for the data center are obtained. Technology pre-requisite parameters for the data center are obtained. An optimum data center efficiency is determined given the target parameters for the data center and the technology pre-requisite parameters for the data center.

A more complete understanding of the present invention, as well as further features and advantages of the present invention, will be obtained by reference to the following detailed description and drawings.

BRIEF DESCRIPTION OF THE DRAWINGS

FIG. 4 is a table of exemplary real-time values used in a case study implementing the present techniques, the real-time values having been collected over a twelve month period, according to an embodiment of the present invention;

DETAILED DESCRIPTION OF PREFERRED EMBODIMENTS

Provided herein are techniques for deriving an optimum Power Usage Effectiveness (PUE) or Data Center Infrastructure Efficiency (DCIE) given i) requirements/targets, ii) specifics (i.e., technology prerequisites) of a particular data center (DC), and iii) real-time values. For instance, by comparing the "measured PUE" with a theoretical PUE, the present techniques allow DC operators to reduce energy costs based on the goals as well as requirements.

Figure 1:
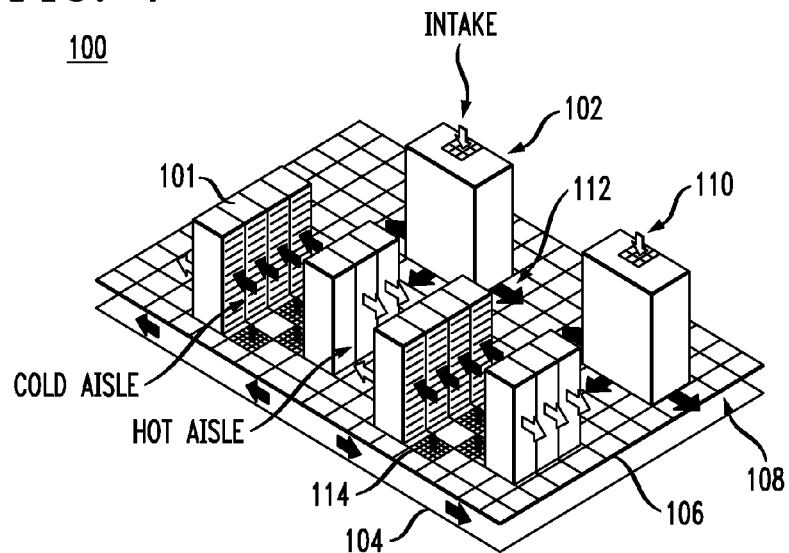
FIG. 1 is a diagram illustrating an exemplary data center according to an embodiment of the present invention.

FIG. 1 is a diagram illustrating exemplary data center 100. Data center 100 has information technology (IT) racks 101 and a raised-floor cooling system with air conditioning units (ACUs) 102 (also referred to herein as computer room air conditioners (CRACs), see below) that take hot air in (typically from above through one or more air returns in the CRACs) and exhaust cooled air into a sub-floor plenum below. Hot air flow through data center 100 is indicated by light arrows 110 and cooled air flow through data center 100 is indicated by dark arrows 112.

In FIG. 1, IT racks 101 use front-to-back cooling and are located on raised-floor 106 with sub-floor 104 beneath. Namely, according to this scheme, cooled air is drawn in through a front (inlet) of each rack and warm air is exhausted out from a rear (outlet) of each rack. The cooled air drawn into the front of the rack is supplied to air inlets of each IT equipment component (servers for example) therein. Space between raised floor 106 and sub-floor 104 defines the sub-floor plenum 108. The sub-floor plenum 108 serves as a conduit to transport, e.g., cooled air from the ACUs 102 to the racks. In a properly-organized data center (such as data center 100), racks 101 are arranged in a hot aisle—cold aisle configuration, i.e., having air inlets and exhaust outlets in alternating directions. Namely, cooled air is blown through perforated floor tiles 114 in raised-floor 106, from the sub-floor plenum 108 into the cold aisles. The cooled air is then drawn into racks 101, via the air inlets, on an air inlet side of the racks and dumped, via the exhaust outlets, on an exhaust outlet side of the racks and into the hot aisles.

The ACUs typically receive chilled water from a refrigeration chiller plant (not shown), also referred to herein simply as a "chiller." Each ACU typically includes a blower motor to circulate air through the ACU and to blow cooled air, e.g., into the sub-floor plenum. As such, in most data centers, the ACUs are simple heat exchangers mainly consuming power needed to blow the cooled air into the sub-floor plenum.

Typically, one or more power distribution units (PDUs) (not shown) are present that distribute power to the IT equipment racks 101. As will be described in detail below, power consumption by the PDUs can be an important consideration in the present techniques. In general, since the PDUs supply electrical power required by the IT equipment in a data center, a total electrical power intake of the PDUs represents an important parameter in determining the energy efficiency of a data center. Uninterruptable power supplies or UPS (not shown) are also typically implemented in a data center to protect the IT equipment in the event of a power disruption so as to prevent data loss (i.e., UPS provides short term power when the power source fails). As is known in the art, the UPSs might also correct common utility power issues, such as voltage spikes.

Figure 2:
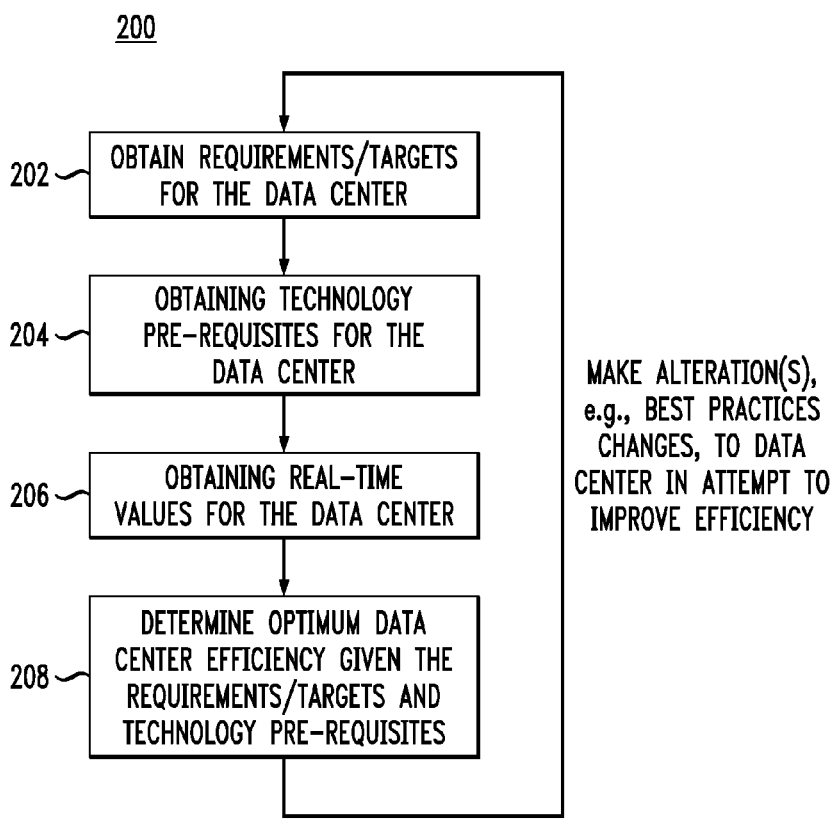
FIG. 2 is a diagram illustrating an exemplary methodology for improving data center operations according to an embodiment of the present invention.

As provided above, the present techniques are directed to deriving an optimum efficiency, i.e., PUE or DCIE, given requirements/targets, technology prerequisites and real-time values of a particular data center (DC). The optimum efficiency determined can then be used to improve the operations of the data center. According to one embodiment, FIG. 2 is a diagram illustrating exemplary methodology 200 for improving data center operations. In step 202, requirements or targets for the data center are obtained:

Requirements/Targets: Requirements/targets refer to parameters in the data center set, e.g., by a user (such as a data center operator), which indicate what the user would like (target) the parameters to be. For instance, the user might set a target ACU utilization, a maximum inlet temperature and a target inlet temperature standard deviation. See below.

According to an exemplary embodiment, the requirements/targets of the data center are represented by the following three parameters:

1. N+1 target for ACUs (air conditioning unit) utilization $\upsilon_T$, also referred to herein as the ACU redundancy target.
2. Maximum allowable hotspot temperature $T_{HS}$.
3. Target inlet temperature distribution (here characterized by a standard deviation $\sigma_T$).

1. Target ACU Utilization: N+1 redundancy is a form of resilience that ensures system availability in the event of component failure, wherein components N have at least one independent backup component +1. According to an exemplary embodiment, the total ACU utilization $\upsilon_T$ is given by a ratio of heat dissipated by the data center (i.e., a sum of the heat removed by all of the ACUs) and a total cooling capacity of active ACUs (i.e., a sum of the capacity of all ACUs). Prior studies have shown that data centers may operate with very low (average) utilization levels (i.e., less than 50%). This means that data centers often have more than 2× the cooling capacity than what they actually need. While about 100% target ACU utilization will leave the data center with no (active) redundancy, most data centers have originally been designed for $\upsilon_T$=86% (N+1 with N=7). The present techniques let a data center operator choose a target ACU utilization based on N+1 redundancy requirements.

2. Maximum allowable inlet hotspot temperature: American Society of Heating, Refrigerating and Air-Conditioning Engineers (ASHRAE) provides recommendations and guidelines regarding the allowable temperatures to the inlets of different classes of IT equipment. See, for example, ASHRAE TC 9.9 2011 Thermal Guidelines for Data Processing Environments Expanded Data Center Classes and Usage Guidance Whitepaper prepared by ASHRAE Technical Committee (TC) 9.9, the contents of which are incorporated by reference herein.

In most cases though the user/data center operator wants to choose a maximum inlet temperature, also referred to herein as hotspot temperature $T_{HS}$, which is tolerable based on specific requirements of the respective facility. One of skill in the art would be able to ascertain the maximum inlet temperature(s) for a given facility. It is notable that an operator might choose different $T_{HS}$ for different pieces of equipment and/or for different applications, which are serviced by the IT equipment. However, for simplicity and clarity of description, it is assumed here that there is only one maximum inlet temperature.

3. Inlet temperature distribution: In practice most data centers exhibit a truncated bell-shaped distribution of inlet temperatures. See, for example, H. F. Hamann et al., "Methods and Techniques for Measuring and Improving Data Center Best Practices," Proceeding of 11th ITHERM, pgs. 1146-1152 (2008) (hereinafter "Hamann"), the contents of which are incorporated by reference herein, which shows in FIG. 3 an inlet temperature distribution of a large scale data center. This distribution might be characterized by a normal distribution with a mean μ and a standard deviation σ. See Hamann. This mean/standard deviation is often a good measure for the level of best practices in operating the data center but it also has to be viewed in context of the particular facility at hand. For example, an active (meaning a center with lots of equipment movements, etc.) legacy data center with a low ceiling height and shallow plenum for cold air delivery will have a larger σ than a stable data center which uses hot and cold aisle containments. See Hamann. The present techniques allow users/data center operators to choose a target inlet temperature standard deviation $\sigma_T$.

In step 204, technology pre-requisites for the data center are obtained:

Technology prerequisites: The data center might be characterized by the following parameters:

1. Whether Variable Frequency Drive (VFD) Technology is employed in the data center. VFD controls the speed of a rotational or linear AC motor by controlling the frequency of the electrical power supplied to the motor.
    a. Exponent of the blower power as a function of fan speed: n.
2. Number of available ACUs within the data center: $\#_{available}^{ACU}$
3. Blower power for each ACU: $P_{blower}^{ACU}$ [kW] blower
4. Data center area: $A_{DC}$ [sq. feet]
5. Cooling capacity of each ACU: $P_{cap}^{ACU}$ [kW].
6. Power distribution loss factor: $f_{PDU}$ [%]
7. ACU factor accounting for amount of power consumed for humidity control: $f_{ACU}$ [%]
8. UPS loss factor: $d_{UPS}$ [%]
9. Power factor for lighting: $f_{light}$ [kW/sq. feet]
10. Chiller factor, which accounts for the fractional power consumption (based on total heat load) for pumping the chilled water as well as for power consumption in the cooling towers: $f_{chill}$ [%]
11. Coefficient of performance $COP_{chill}$ for chilling system at some given outside temperature $T_{OS,0}$ and discharge (set point) temperature $T_{S,0}$ for the ACUs a. temperature coefficient of $COP_{chill}$ with set point $T_S$: $m_1$ [%/F]
b. temperature coefficient of $COP_{chill}$ with outside temperature $T_{OS}$: $m_2$ [%/F]
12. "Free Cooling" Technology [Y/N] or chiller utilization factor $\chi$ [%]
    a. Temperature differential between outside air temperature and free cooling temperature $\Delta T$ [F]

It is notable that some of these parameters such as $f_{PDU}$, $f_{ACU}$, $f_{UPS}$, $f_{light}$, $f_{pump}$, $COP_{chill}$, $m_1$, $m_2$, $\Delta T$ etc. may have to be assessed and evaluated in a survey of the respective data center.

In step 206, real-time values for the data center are obtained:

Real-time Values: As provided above, the present techniques may also take into account real-time values associated with one or more parameters in the data center. For example, the blower power of the ACUs can be measured in real-time using power measurement equipment. Another example is measuring the power consumption of the chiller as a function of load, which yields directly the Chiller coefficient of performance.

Preferably, the parameters analyzed are those that can change frequently. Thus, by factoring real-time values for these more variable parameters, the model created will be more up-to-date and thus will reflect current conditions in the facility. According to an exemplary embodiment, the real-time values used are an average of values acquired for the facility over a month-long evaluation period. The process for measuring/acquiring these values in a data center would be apparent to one of skill in the art.

According to an exemplary embodiment, the present techniques take the following parameters into account, which may change frequently such as:

Power consumption of all IT equipment $P_{IT}$ [kW]

All IT equipment refers to all of the information processing equipment in the data center, including but not limited to servers, storage, tape, optical disk, network switching equipment and others. For a given data center, one of skill in the art would be able to, given the present teachings, identify each piece of processing equipment in that particular given data center.

Miscellaneous power consumption (for example of other equipment, which is not uninterrupted power supply (UPS)) which adds to the heat load of the data center $P_{MIS}$ [kW]. Miscellaneous power consumption $P_{MIS}$ includes all power consumption with the data center room, which is not connected to the PDUs. For example, the power consumption of auxiliary computers in the data center which use line power would be part of the miscellaneous power.

Outside temperature $T_{OS}$ [F]. It is notable that $T_{OS}$ for water-side cooling systems should be the wet bulb temperature $T_{OS}=T_{WB}$ while for air-cooled cooling systems it is the dry bulb temperature $T_{OS}=T_{DB}$.

In step 208, the optimum data center efficiency (PUE or DCIE) is determined given the requirement/targets and technology pre-requisites. An exemplary method for determining optimum data center efficiency is described in conjunction with the description of FIG. 3, below. One or more alterations to the data center IT infrastructure, cooling, etc. may be made (for example in accordance with known 'best practices' guidelines) in an attempt to improve the data center efficiency. The steps of the methodology may then be performed again and the resulting updated efficiency calculation (step 208) can be compared with the efficiency calculation from the previous iteration(s) of methodology 200 to determine whether (or not) the alterations/changes implemented had any effect on efficiency. Thus, it can be determined here whether a given alteration/change or alterations/changes for a given data center result(s) in greater or lesser efficiency, or possibly no change at all. A description of best practices guidelines is provided below.

Figure 3:
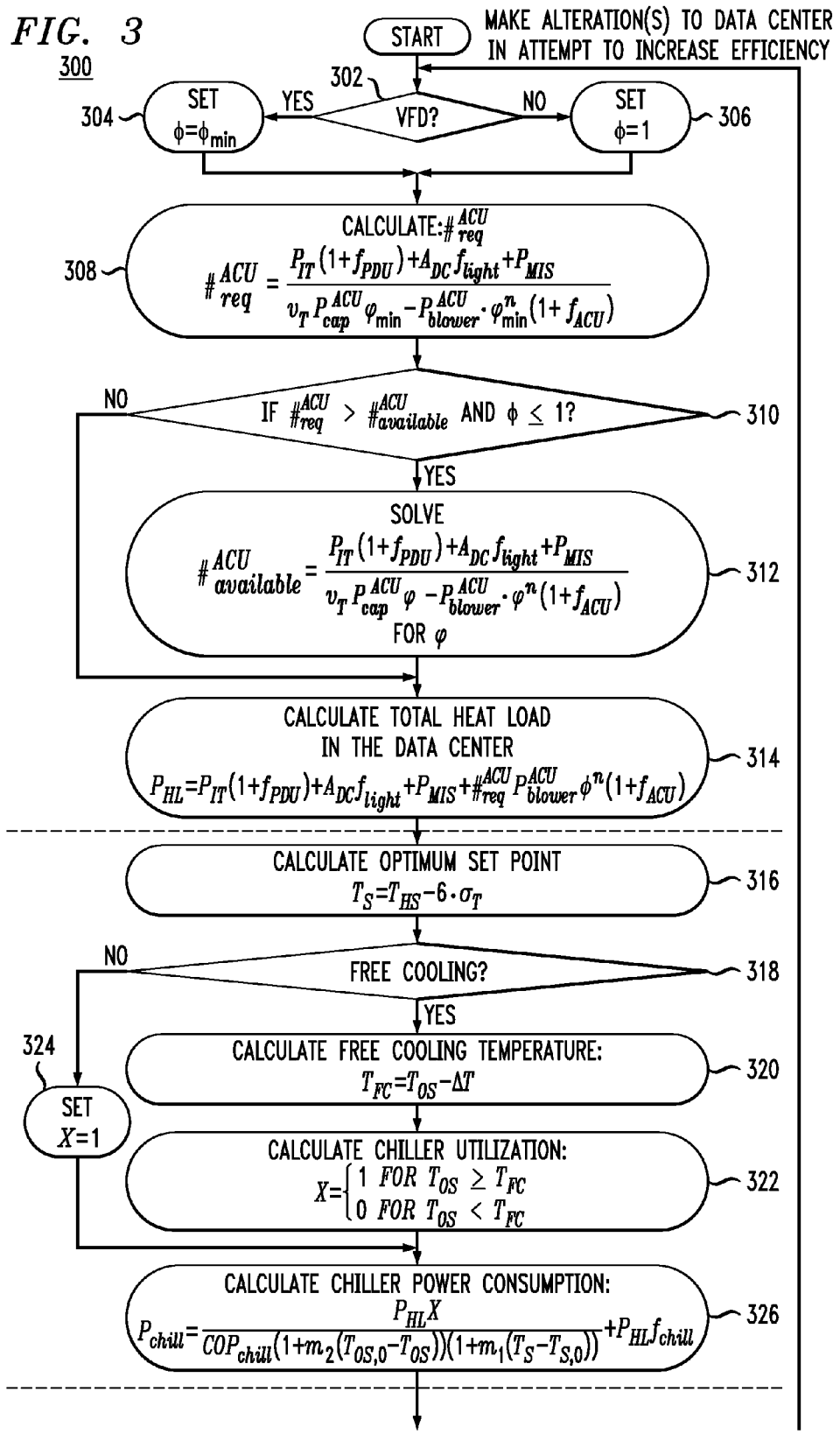
FIG. 3 is a diagram illustrating an exemplary methodology for determining an optimum Power Usage Effectiveness (PUE) and optimum Data Center Infrastructure Efficiency (DCIE) according to an embodiment of the present invention.
Figure 3:
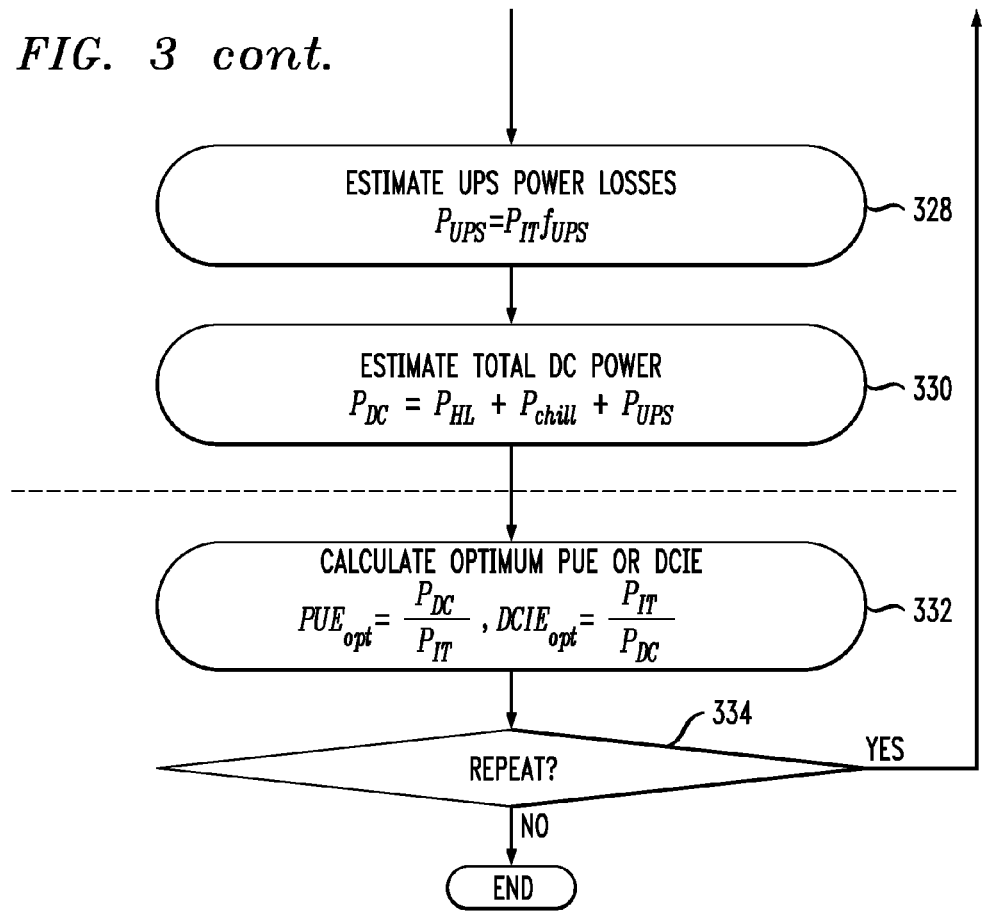

As per step 208, the optimum data center efficiency (PUE or DCIE) is determined given the requirement/targets and technology pre-requisites. One exemplary method for calculating data center efficiency given the requirement and pre-requisite data is provided in FIG. 3. Specifically, FIG. 3 is a diagram illustrating an exemplary methodology 300 for determining optimum PUE or DCIE for a given data center given the above-described requirements/targets, technology prerequisites, and real-time values.

Optimum PUE or DCIE Calculation: For simplicity it is assumed in the following discussion that all ACUs in the data center are the same (i.e., possess the same blower power, cooling capacity, etc.).

The first task is to calculate a number of required ACUs $\#_{req}^{ACU}$ and total heat load $P_{HL}$ in the data center. Namely, the number of required ACUs under optimum data center conditions is calculated given the N+1 target, which is then used to determine the total heat load. This calculation is dependent on whether or not VFD technology is utilized in the data center. Thus, in step 302 a determination is made as to whether VFD technology is being employed in the data. As described above, the presence/absence of VFD technology is one technology prerequisite of a given data center. It is notable, that with VFD technology ideally one wants to use as many ACUs as possible with as low of a blower setting as possible. Without VFD technology one would ideally want to run as few ACUs as possible. Thus, if the data center employs VFD technology (Y), then in step 304 the relative fan speed $\phi$ is set to $\phi_{min}$. On the other hand, if the data center does not employ VFD technology (N), then in step 306 the relative fan speed $\phi$ is set to 1.

In step 308, the number of required ACUs $\#_{req}^{ACU}$ is then determined. The case where VFD technology is not available is described first, followed by a description of the case where VFD technology is available:

Without VFD Technology: The total heat load $P_{HL}$ and cooling capacity $P_{cap}$ for the data center are given by:

$$P_{HL}=P_{IT}(1+f_{PDU})+A_{DC}f_{light}+P_{MIS}+\#_{req}^{ACU}P_{blower}^{ACU}(1+f^{ACU}) \quad (1)$$

$$P_{cap}=\#_{req}^{ACU}P_{cap}^{ACU}. \quad (2)$$

For a given target utilization $\upsilon_T$, the required number of ACUs is then readily determined using $P_{HL}=\upsilon_T P_{cap}$ to:

$$\#_{req}^{ACU} = \frac{P_{IT}(1+f_{PDU})+A_{DC}f_{light}+P_{MIS}}{\upsilon_T P_{cap}^{ACU} - P_{blower}^{ACU}(1+f_{ACU})}. \quad (3)$$

Since $\#_{req}^{ACU}$ is an integer, the result of Equation 3 would be rounded to an integer (typically up to the next highest number to provide some additional margins). Based on the number of ACUs required $\#_{req}^{ACU}$, a determination is made in step 310 regarding how the number of ACUs required $\#_{req}^{ACU}$ equates with the number of ACUs available $\#_{available}^{ACU}$ (i.e., the number of operating ACUs) in the data center. Specifically, in the case where the number of ACUs required $\#_{req}^{ACU}$ is less than the number of operating ACUs (N), a data center operator has the opportunity to turn off ACUs and thereby improve the PUE. If the operator fails to operate with less ACUs (e.g., the operator chooses not to turn off any of the ACUs), then the actual PUE will show a larger difference to the optimum PUE. In the case where the number of ACUs required $\#_{req}^{ACU}$ is larger than the numbers of available ACUs $\#_{available}^{ACU}$ (Y), the data center is operating below redundancy target. In this case the "optimum" PUE could be actually "less" than what the actual PUE measurement would yield. In this case the data center operator might consider changing the redundancy target. This is the case when VFD technology is not available in the data center. However, as will be described next, when VFD technology is employed in the data center, then there is an option (as per step 312, described below) to adjust the relative fan speed to make the number of ACUs required $\#_{req}^{ACU}$ on target with the number of ACUs available $\#_{available}^{ACU}$ in the data center. This option is available only in the case of VFD technology.

The total heat load $P_{HL}$ for the data center is then calculated in step 314. In the case of a non-VFD data center, total heat load $P_{HL}$ can be calculated using Equation 1, see above.

With VFD technology: The calculation for the numbers of required ACUs $\#_{req}^{ACU}$ is somewhat different if VFD technology is available. This is because $\#_{req}^{ACU}$ is a function of the VFD setting or relative fan speed $\phi$. The relative fan speed $\phi$ can in principle range from 0 to 1 but in practice is often capped (due to the blower performance) at the lower range ($\phi_{min}$). Because the fan speed can be throttled using VFD technology the cooling capacity for an individual ACU is given by $P_{cap}^{ACU} = \phi_i P_{cap,o}^{ACU}$ where $P_{cap,o}^{ACU}$ is the cooling capacity at 100%. For simplicity, it is assumed that all available ACUs in the data center are equipped with the same VFD technology. The blower power for each of these ACUs could then be represented by $P_{blower}^{ACU} = P_{blower,o}^{ACU} \cdot \phi^n$. The exponent of blower power n can vary depending on the details of the implemented technology but according to an exemplary embodiment, a value of n=3 is employed. One way to determine the exponent of blower power is to measure the blower power consumption as a function of fan speed. Specifically, by plotting blower power consumption as a function of fan speed in a double logarithmic plot, the linear slope of the curve yields the exponent. The first step is to determine the number of required ACUs $\#_{req}^{ACU}$ at a minimum VFD setting:

$$\#_{req}^{ACU} = \frac{P_{IT}(1+f_{PDU}) + A_{DC}f_{light} + P_{MIS}}{v_T P_{cap,o}^{ACU} \varphi_{min} - P_{blower,o}^{ACU} \cdot \varphi_{min}^n (1+f_{ACU})}. \quad (4)$$

It is notable that with $\phi_{min}=1$ (see step 306, described above), Equation 4 is identical to Equation 3. As above, in step 310 (in this case with VFD technology present in the data center) a determination is made regarding how the number of ACUs required $\#_{req}^{ACU}$ equates with the number of ACUs available $\#_{available}^{ACU}$ (i.e., the number of operating ACUs) in the data center. Specifically, in the case where $\#_{req}^{ACU}$ is less than the numbers of operating ACUs (N), an operator has the chance to turn off some ACUs and thereby improve the PUE. In the case where $\#_{req}^{ACU}$ is larger than the numbers of available ACUs $\#_{available}^{ACU}$ (Y), there are two choices for the data center operator to meet the redundancy target. The data center operator can either i) add additional ACUs with VFD technology (to increase $\#_{available}^{ACU}$) to improve the data center energy efficiency (i.e., change the technology prerequisites, see above) or ii) increase the relative fan speed $\phi$ so that Equation 4 yields $\#_{req}^{ACU} = \#_{available}^{ACU}$ (i.e., increasing the relative fan speed decreases the number of ACUs required for cooling). The easiest way to determine by how much the relative fan speed $\phi$ needs to be increased would be to plot the result of Equation 4 as a function of relative fan speed $\phi$. See step 312. Option i and/or option ii can be implemented (by the data center operator) in order to try and improve the efficiency of the data center. For instance, as described above and in further detail below, the output of methodology 300 is a PUE/DCIE value which reflects the efficiency of the data center. In an attempt to improve the efficiency of the data center, the data center operator may change one or more parameters in the data center, such as by adding additional ACUs (with VFD technology) and/or increasing the relative fan speed in an attempt to increase the data center efficiency.

As above, in step 314, the total heat load $P_{HL}$ for the data center is then calculated. The total heat load $P_{HL}$ for the data center in the VFD case is given by:

$$P_{HL} = P_{IT}(1+f_{PDU}) + A_{DC}f_{light} + P_{MIS} + \#_{req}^{ACU} P_{blower,o}^{ACU} \phi^n(1+f_{ACU}). \quad (5)$$

It is notable that with $\phi=1$ (see step 306, described above), Equation 5 is identical to Equation 1 (non-VFD case), above.

Next a determination of the optimum set point $T_S$ is made. To do so, a determination of the chiller power consumption is needed.

Determine Chiller Power Consumption: The power consumption for chiller systems ($P_{CHILL}$) can be very complex. A simplistic form of determining the chiller power consumption is given by:

$$P_{chill} = \frac{P_{HL}\chi}{COP_{chill}(1+m_2(T_{OS,0}-T_{OS}))(1+m_1(T_S-T_{S,0}))} + P_{HL}f_{chill} \quad (6)$$

with the first term $$\left(\frac{P_{HL}\chi}{COP_{chill}(1+m_2(T_{OS,0}-T_{OS}))(1+m_1(T_S-T_{S,0}))}\right)$$

as the power dissipation associated with the compression cycle and the second term ($P_{HL}, f_{chill}$) as the power associated with the pumping of the coolant and the cooling tower. $COP_{chill}$ is a coefficient of performance of the chiller plant system at a given outside temperature $T_{OS,0}$ and air discharge temperature set point $T_{S,0}$ (i.e., temperature at the discharge location of the ACU). For example, for a water-side central chiller plant, $COP_{chill}$ might be 5 if the outside wet bulb temperature is $T_{OS,0}=62$ degrees Fahrenheit (° F.) and the ACU discharge temperature is $T_{S,0}=58$° F. Wet bulb temperatures can be computed from the air temperature and the relative humidity using a psychometric chart. See for example "Wet-Bulb Temperature and Relative Humidity from Air Temperature and Dewpoint Temperature" available from the National Weather Service Western Region Headquarters, the contents of which are incorporated by reference herein. For a direct expansion system with air-side cooling one might find a $COP_{chill}=4$ for an outside air temperature of $T_{OS,0}=62$° F. and a discharge temperature of $T_{S,0}=58$° F. The coefficients $m_2$ and $m_1$ describe the changes of the coefficient of performance as a function of outside ($T_{OS}$) and set point temperature ($T_S$), respectively. For a typical central chiller plant using water side cooling, $m_1$ and $m_2$ are on the order of 2% 1° F. while for a distributed air-side DX (direct-expansion) cooling system one can find larger values of 10%/° F.

The set point or discharge temperature $T_S$ is directly under the control of the data center operation. In order to determine the highest possible set point $T_S$, as per step 316, one needs to measure the temperature distribution of the data center. Here it is assumed that a normal distribution with a target standard deviation $\sigma_T$ exists. Applying the three sigma rule (a well-known concept in statistics that for most distributions most of the population lies within three standard deviations of the mean) and taking the maximum allowable hotspot temperature $T_{HS}$ requirement into account (which would mean that only 0.15% of all servers within the data center experience inlet temperatures above the chosen hotspot temperature $T_{HS}$), the highest (and thus most energy efficient) set point can be determined as follows:

$$T_S = T_{HS} - 6 \cdot \sigma_T. \qquad (7)$$

A determination is then made in step 318 as to whether (or not) the data center has the ability to use "free cooling." The concept of free cooling is described, for example, in U.S. Pat. No. 8,020,390 issued to Hamann et al. (hereinafter "Hamann '390"), the contents of which are incorporated by reference herein. As described in Hamann '390, free cooling by way of a cooling tower can be used, for example, when the outside temperature drops below a certain value, thus bypassing the chiller plant. Free cooling can be realized using, e.g., a plate frame heat exchanger or air-side economizers.

The chiller utilization factor $\chi$, which is simply factorized into Equation 6, can be different from $\chi=1$. Specifically, this factor $\chi$ is governed by the duration in which the chiller systems can be turned off by either using a frame plate heat exchanger between the ACU water loop and chiller water loop and/or using outside air directly. Equation 6 is somewhat a simplification because it assumes that—if free cooling is used—no additional pumping/transport work is imposed on the cooling system. Free cooling can be used whenever the outside temperatures are below the set point (whether it is dry bulb or wet bulb temperature). Often, additional losses in the heat exchange need to be taken into account, which are characterized here by $\Delta T$. When free cooling is available (Y), in step 320 a free cooling temperature $T_{FC}$ is calculated by:

$$T_{FC} = T_{OS} - \Delta T. \qquad (8)$$

And in step 322, the chiller utilization factor $\chi$ (for the purposes of calculating chiller power consumption) is then given by:

$$\chi = \begin{cases} 1 & \text{for } T_{OS} \geq T_{FC} \\ 0 & \text{for } T_{OS} < T_{FC}. \end{cases} \qquad (9)$$

It is notable that more complicated functions for Equation 8 could be used where partial free cooling is taken into account. For example, $\chi$ could be a smooth function of TOS or we could include three different settings with $\chi=0, 0.5, 1$. Changing the free cooling utilization (i.e., the duration for which the chiller system can be turned off) can be implemented (by the data center operator) in order to try and improve the efficiency of the data center. For instance, as described above and in further detail below, the output of methodology 300 is a PUE/DCIE value which reflects the efficiency of the data center. For example, in an attempt to improve the efficiency of the data center, the data center operator may change one or more parameters in the data center, such as by increasing the amount of time free cooling is utilized (and thereby increase the duration the chiller system is turned off) in an attempt to increase the data center efficiency.

As described above, when free cooling is not available as an option, then as per step 324 the chiller utilization factor $\chi$ (for the purposes of calculating chiller power consumption) is set to 1. In step 326, chiller power consumption is calculated using the above chiller utilization factor $\chi$ in accordance with Equation 6.

The next step in the process is to use the calculated total heat load in the data center and the chiller power consumption, both calculated as described above, to determine the total data center power.

Determining total data center (DC) Power: The total power consumption $P_{DC}$ is given by:

$$P_{DC} = P_{HL} + P_{chill} + P_{UPS}, \qquad (10)$$

with $P_{UPS}$ as the power losses in the UPS (un-interruptible power supplies) system. UPS system power losses can be decreased by improving UPS utilization, which not only saves energy but also reduces costs of purchasing additional UPS systems. In step 328 UPS system power losses $P_{UPS}$ can be calculated as follows:

$$P_{UPS} = P_{IT} f_{UPS}. \qquad (11)$$

As provided above, $P_{IT}$ is the power consumption of all IT equipment in the data center and may be measured in kilowatts (kW). Based on the UPS system power losses $P_{UPS}$, and the above-determined total heat load in the data center $P_{HL}$ and chiller power consumption $P_{chill}$, in step 330, the total data center power $P_{DC}$ can be determined as per Equation 10, above.

Calculate DCIE and PUE: The final task is then to calculate the optimum Power Usage Effectiveness ($PUE_{opt}$) or Data Center Infrastructure Efficiency ($DCIE_{opt}$). These calculations are based on the power consumption of all IT equipment in the data center $P_{IT}$ and the total data center power $P_{DC}$. Namely, in step 332, the optimum Power Usage Effectiveness ($PUE_{opt}$) and/or Data Center Infrastructure Efficiency ($DCIE_{opt}$) are determined using:

$$DCIE_{opt} = P_{IT} / P_{DC} \qquad (12)$$

or $$PUE_{opt} = P_{DC} / P_{IT}$$

According to an exemplary embodiment, the power consumption of all IT equipment in the data center $P_{IT}$ is the power consumed by IT and related equipment, such as uninterruptible power supplies (UPSs), power distribution units (PDUs), cabling and switches. The IT power consumption can be measured, for example, directly at one or more of the PDUs present throughout the data center. As described generally above with regard to methodology 200, and as described here with reference to step 334, based on the outcome of methodology 300, adjustments in the data center may be made (with an eye towards improving the efficiency) and methodology 300 may be performed again to determine whether the adjustments improved the efficiency (or not). For instance, the higher the DCIE (or conversely the lower the PUE) the better. Thus, changes can be made in an attempt to increase the DCIE/decrease the PUE (determined by way of methodology 300).

By way of example only, 'best practices' changes that may be made in an attempt to increase the data center efficiency are described, for example, in "2012 Best Practices for the EU Code of Conduct on Data Centres," version 3.0.8, Dec. 15, 2011 (hereinafter "EU Code of Conduct") the entire contents of which are incorporated by reference herein. By way of example only, the EU Code of Conduct describes, e.g., in Section 4 best practices related to IT Equipment and Services, in Section 5 best practices related to Cooling, etc. which may be implemented in an attempt to increase the data center efficiency (as determined using the present techniques). By way of example only, the EU Code of Conduct specifies selecting equipment suitable for the given data center power density and air flow direction, employing energy star hardware, selecting free standing equipment having an air flow direction that matches the air flow design in the applicable area in the data center, etc. Thus any non-compliant equipment (i.e., equipment that does not conform to the best practices specified in the EU Code of Conduct) can be replaced, moved or modified according to the EU Code of Conduct guidelines. Also, for example, with regard to cooling the EU Code of Conduct specifies that a hot aisle/cold aisle configuration be employed, that groups of equipment having different environmental requirements and/or air flow direction be segregated, replace solid doors with (partially) perforated doors to ensure air flow, etc. The suggested changes here based on the EU Code of Conduct guidelines are merely exemplary, and many other suitable changes are provided in the EU Code of Conduct the contents of which, as provided above, are incorporated by reference herein. It is notable that, given the EU Code of Conduct as a guide and the present teachings, one of skill in the art would be able to implement best practices changes to a given data center given application-specific requirements, such as, budget constraints, space constraints, configuration constraints, etc. Of course, due for example to these exemplary highlighted constraints, it may not be possible to implement all of the best practices described in the EU Code of Conduct for a given data center. However, changes may be made individually (or in multiple) in accordance with the present teachings in order to improve the data center efficiency.

Based on the technology prerequisites (which as described above, is the technology available in the data center, i.e., the technology the data center operator has at his/her disposal) there will be a maximum achievable efficiency (i.e., a maximum efficiency achievable for a given set of technology prerequisites). Once that is achieved, as determined by methodology 300, then as shown in FIG. 3, methodology 300 is completed (end).

As described above, the PUE/DCIE is affected by environmental conditions (e.g., the power consumption for chiller systems ($P_{CHILL}$) is a factor of the outside temperature, see above). Thus, as the environmental conditions change, the optimal PUE/DCIE likewise can change. Thus, the steps of methodology 300 may be repeated, e.g., so as to capture changes in conditions that can occur which affect the optimal PUE/DCIE value. For instance, outside temperatures can fluctuate throughout the day, month, year, etc. Accordingly, in order to capture these temperature changes, methodology 300 may be repeated at (e.g., predetermined) time intervals. While using a shorter time interval will likely result in more accurate calculations, a balance must be reached regarding the time needed to collect the data and perform the calculations. See, for example, the case study described below where methodology 300 is performed at a month-by-month time interval. The steps of methodology 300 can easily be performed on a day-by-day, month-by-month basis, etc., although shorter time intervals may also be implemented depending on the location of the data center. For instance, if the data center is located in a region which experiences vast fluctuations in temperature throughout a given 24 hour period (the duration of one day), then it may be beneficial to perform methodology 300 for that data center at 12 hour intervals, or shorter, in order to keep the data center running efficiently. Accordingly, the steps of methodology 300 may be repeated in order to achieve a greater efficiency and/or at predetermined intervals so as to accommodate environmental changes that may occur in the vicinity of the data center.

The present techniques are further illustrated by way of reference to the following non-limiting example. A case study was conducted using the following parameters:

1. Targets/Requirements:
N+1 target for ACU (air conditioning unit) utilization $\upsilon_T$: $\upsilon_T=75\%$
Maximum allowable hotspot temperature $T_{HS}$: $T_{IE}=90$
Target inlet temperature distribution $\sigma_T=4°$ F.

2. Technology Prerequisites:
Variable Frequency Drive (VFDs) Technology [No]
Exponent of the blower power as a function of fan speed n does not apply here
Number of available ACUs within the data center: $\#_{available}^{ACU}=31$
Blower power for each ACU: $P_{blower}^{ACU}=7.5$ KW
Data center (DC) area: $A_{DC}=25000$
Cooling capacity of each ACU: $P_{cap}^{ACU}=120$ kW
Power distribution loss factor: $f_{PDU}=0.05$ (5%)
ACU factor: $f_{ACU}=0.1$ (10%)
UPS loss factor: $f_{UPS}=0.1$ (10%)
Lighting power factor: $f_{light}=0.0015$ kW/sq. feet
Chiller factor: $L_{chill}=0.05$ (5%)
Chiller coefficient of performance $COP_{chill}=4.5$ @ $T_{OS,0}=T_{WB}=62°$ F. and $T_{S,0}=58°$ F.
Temperature coefficient of $COP_{chill}$ with set point: $m_1=2\%/°$ F.
Temperature coefficient of $COP_{chill}$ with outside temperature: $m_2=2\%/°$ F.
"Free Cooling" Technology [Yes]
Temperature differential between $T_{OS}$ and $T_{FC}$: $\Delta T=T_{OS}-T_{FC}°$ F.

The real-time values used in the case study, compiled over a 12 month period from January to December are presented in FIG. 4. Specifically, in FIG. 4, values are given for wet bulb temperature, the power consumption of all IT equipment in the data center $P_{IT}$ (measured in kW), miscellaneous power consumption $P_{MS}$ (measured in kW), and number (#) of required ACUs.

Figures 5, 6:
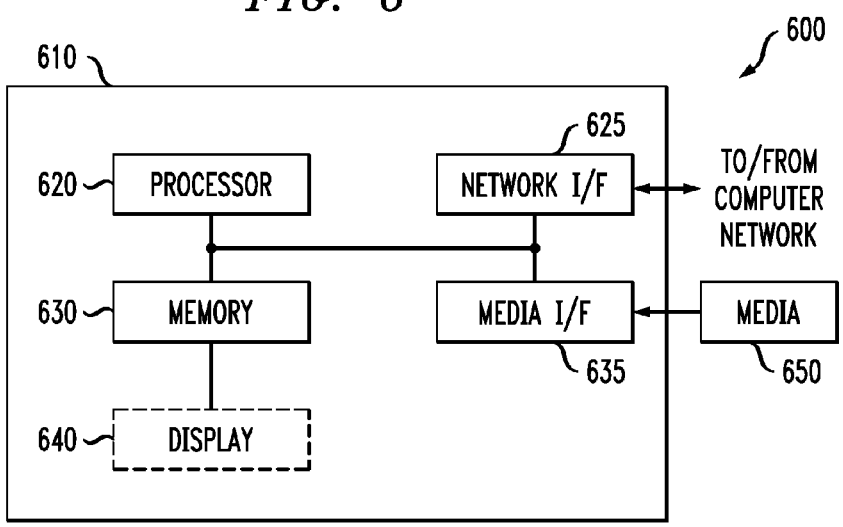
FIG. 5 is a table of exemplary results of the case study according to an embodiment of the present invention.
FIG. 6 is a diagram illustrating an exemplary apparatus for determining an optimum PUE and optimum DCIE according to an embodiment of the present invention.

Exemplary results of the case study are provided in FIG. 5. In FIG. 5, the number of required ACUs, the total heat load $P_{HL}$ (in kW), chiller utilization, the power consumption for chiller systems $P_{chill}$ (in kW), total data center power $P_{DC}$ (in kW), and optimum DCIE are provided for each of the twelve months of the case study.

Turning now to FIG. 6, a block diagram is shown of an apparatus 600 for determining data center efficiency, in accordance with one embodiment of the present invention. It should be understood that apparatus 600 represents one embodiment for implementing methodology 200 of FIG. 3 and/or methodology 300 of FIG. 3, described above.

Apparatus 600 includes a computer system 610 and removable media 650. Computer system 610 includes a processor device 620, a network interface 625, a memory 630, a media interface 635 and an optional display 640.

Network interface 625 allows computer system 610 to connect to a network, while media interface 635 allows computer system 610 to interact with media, such as a hard drive or removable media 650. As is known in the art, the methods and apparatus discussed herein may be distributed as an article of manufacture that itself includes a machine-readable medium containing one or more programs which when executed implement embodiments of the present invention. For instance, the machine-readable medium may contain a program configured to obtain target parameters for the data center; obtain technology pre-requisite parameters for the data center; and determine an optimum data center efficiency given the target parameters for the data center and the technology pre-requisite parameters for the data center.

The machine-readable medium may be a recordable medium (e.g., floppy disks, hard drive, optical disks such as removable media 650, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used.

Processor device 620 can be configured to implement the methods, steps, and functions disclosed herein. The memory 630 could be distributed or local and the processor device 620 could be distributed or singular. The memory 630 could be implemented as an electrical, magnetic or optical memory, or any combination of these or other types of storage devices. Moreover, the term "memory" should be construed broadly enough to encompass any information able to be read from, or written to, an address in the addressable space accessed by processor device 620. With this definition, information on a network, accessible through network interface 625, is still within memory 630 because the processor device 620 can retrieve the information from the network. It should be noted that each distributed processor that makes up processor device 620 generally contains its own addressable memory space. It should also be noted that some or all of computer system 610 can be incorporated into an application-specific or general-use integrated circuit.

Optional video display 640 is any type of video display suitable for interacting with a human user of apparatus 600. Generally, video display 640 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A computer-implemented method for determining data center efficiency, comprising the steps of:
   a) obtaining target parameters for the data center;
   b) obtaining technology pre-requisite parameters for the data center which indicate what technology is available in the data center to achieve the target parameters;
   c) determining a total heat load in the data center $P_{HL}$ based on a power consumption of information technology equipment in the data center $P_{IT}$, data center area $A_{DC}$, miscellaneous power consumption in the data center $P_{MIS}$, a number of required air conditioning units in the data center $\#_{req}^{ACU}$, a blower power for each of the air conditioning units $P_{blower}^{ACU}$, a power distribution loss factor $f_{PDU}$, a power for lighting factor $f_{light}$ and a factor accounting for amount of power consumed for humidity control $f_{ACU}$ as:
   $P_{HL}=P_{IT}(1+f_{PDU})+A_{DC}f_{light}+P_{MIS}+\#_{req}^{ACU}P_{blower}^{ACU}(1+f_{ACU})$;
   d) determining an optimum data center efficiency given the target parameters for the data center, the technology pre-requisite parameters for the data center, and the total heat load, wherein real-time values for power consumption in the data center and real-time values for environmental conditions outside of the data center are used for determining one or more of the target parameters for the data center and the technology pre-requisite parameters for the data center, wherein air conditioning units are present in the data center which receive chilled water from a chiller, and wherein the optimum data center efficiency is determined based in part on a chiller power consumption in the data center which is a sum of two components: i) power dissipation associated with running the chiller and ii) a total heat load in the data center multiplied by a chiller factor that represents a percentage of the total heat load for a given data center used for pumping the chilled water, and repeating steps a-d at a predetermined time interval that is set to coincide with fluctuations in the environmental conditions outside of the data center; and
   e) based on the optimum data center efficiency determined in step d, making alterations to the data center which change one or more of the target parameters for the data center and the technology pre-requisite parameters for the data center to improve the optimum data center efficiency, wherein the alterations comprise replacing, moving, or modifying equipment within the data center.

2. The method of claim 1, wherein an uninterruptable power supply system is implemented in the data center.

3. The method of claim 2, wherein the target parameters for the data center comprise i) an air conditioning unit redundancy target, ii) maximum allowable inlet temperatures, and iii) a target inlet temperature distribution.

4. The method of claim 3, wherein the technology pre-requisite parameters for the data center comprise i) whether or not Variable Frequency Drive technology is employed in the data center, ii) a number of available air conditioning units in the data center, iii) a blower power for each of the air conditioning units in the data center, iv) an area of the data center, and v) a cooling capacity of each of the air conditioning units in the data center.

5. The method of claim 4, wherein Variable Frequency Drive technology is employed in the data center, and wherein the technology pre-requisite parameters for the data center further comprise vi) an exponent of blower power.

6. The method of claim 1, further comprising the step of: repeating steps a-d to obtain an updated optimum data center efficiency that reflects the alterations made in the data center.

7. The method of claim 6, further comprising the step of: comparing the optimum data center efficiency with the updated optimum data center efficiency to determine an effect, if any, that the alterations made in the data center had on the data center efficiency.

8. The method of claim 1, further comprising the step of: repeating steps a-d at the predetermined time interval to obtain an updated optimum data center efficiency.

9. The method of claim 2, wherein the optimum data center efficiency is determined as an optimum power usage effectiveness, the method further comprising the steps of:

determining a total power consumption in the data center and a power consumption of information technology equipment in the data center given the target parameters for the data center and the technology pre-requisite parameters for the data center; and determining the optimum power usage effectiveness as a ratio of the total power consumption in the data center to the power consumption of information technology equipment in the data center.

10. The method of claim 9, further comprising the step of:

determining the total power consumption in the data center based on the total heat load in the data center, the chiller power consumption in the data center, and a power loss in the uninterruptible power supply system in the data center.

11. The method of claim 10, further comprising the step of:

determining the number of required air conditioning units in the data center $\#_{req}^{ACU}$ based on the power consumption of information technology equipment in the data center $P_{IT}$, the data center area $A_{DC}$, the miscellaneous power consumption in the data center $P_{MIS}$, an air conditioning unit utilization $\upsilon_T$, a cooling capacity of each of the air conditioning units $P_{cap}^{ACU}$, the blower power for each of the air conditioning units $P_{blower}^{ACU}$, the power distribution loss factor $f_{PDU}$, the power for lighting factor $f_{light}$ and the factor accounting for amount of power consumed for humidity control $f_{ACU}$ as:

$$\#_{req}^{ACU} = \frac{P_{IT}(1+f_{PDU}) + A_{DC}f_{light} + P_{MIS}}{\upsilon_T P_{cap}^{ACU} - P_{blower}^{ACU}(1+f_{ACU})}.$$

12. The method of claim 10, wherein the chiller power consumption in the data center is based on the total heat load in the data center, and a coefficient of performance for the chiller at a given outside temperature, a discharge temperature for the air conditioning units in the data center, and a chiller utilization factor that is governed by a duration for which the chiller system can be turned off.

13. The method of claim 1, further comprising the step of:

updating one or more of the target parameters for the data center and the technology pre-requisite parameters for the data center using the real-time values.

14. A non-transitory article of manufacture for determining data center efficiency, comprising a non-transitory machine-readable medium containing one or more programs which when executed implement the steps of:

a) obtaining target parameters for the data center;

b) obtaining technology pre-requisite parameters for the data center which indicate what technology is available in the data center to achieve the target parameters; and c) determining a total heat load in the data center $P_{HL}$ based on a power consumption of information technology equipment in the data center $P_{IT}$, data center area $A_{DC}$, miscellaneous power consumption in the data center $P_{MIS}$, a number of required air conditioning units in the data center $\#_{req}^{ACU}$, a blower power for each of the air conditioning units $P_{blower}^{ACU}$, a power distribution loss factor $f_{PDU}$, a power for lighting factor $f_{light}$, and a factor accounting for amount of power consumed for humidity control $f_{ACU}$ as:

$P_{HL} = P_{IT}(1+f_{PDU}) + A_{DC}f_{light} + P_{MIS} + \#_{req}^{ACU}P_{blower}^{ACU}(1+f_{ACU})$;

d) determining an optimum data center efficiency given the target parameters for the data center, the technology pre-requisite parameters for the data center, and the total heat load, wherein real-time values for power consumption in the dat center and real-time values for environmental conditions outside of the data center are used for determining one or more of the target parameters for the data center and the technology pre-requisite parameters for the data center, wherein air conditioning units are present in the data center which receive chilled water from a chiller, and wherein the optimum data center efficiency is determined based in part on a chiller power consumption in the data center which is a sum of two components: i) power dissipation associated with running the chiller and ii) a total heat load in the data center multiplied by a chiller factor that represents a percentage of the total heat load for a given data center used for pumping the chilled water, and repeating steps a-d at a predetermined time interval that is set to coincide with fluctuations in the environmental conditions outside of the data center.

15. The article of manufacture of claim 14, wherein an uninterruptable power supply system is implemented in the data center.

16. The article of manufacture of claim 15, wherein the target parameters for the data center comprise i) an air conditioning unit redundancy target, ii) maximum allowable inlet temperatures, and iii) a target inlet temperature distribution.

17. The article of manufacture of claim 16, wherein the technology pre-requisite parameters for the data center comprise i) whether or not Variable Frequency Drive technology is employed in the data center, ii) a number of available air conditioning units in the data center, iii) a blower power for each of the air conditioning units in the data center, iv) an area of the data center, and v) a cooling capacity of each of the air conditioning units in the data center.

18. The article of manufacture of claim 15, wherein the optimum data center efficiency is determined as an optimum power usage effectiveness, the method further comprising the steps of:

determining a total power consumption in the data center and a power consumption of information technology equipment in the data center given the target parameters for the data center and the technology pre-requisite parameters for the data center; and determining the optimum power usage effectiveness as a ratio of the total power consumption in the data center to the power consumption of information technology equipment in the data center.

19. An apparatus for determining data center efficiency, the apparatus comprising:

a memory; and at least one processor device, coupled to the memory, operative to:

a) obtain target parameters for the data center;

b) obtain technology pre-requisite parameters for the data center which indicate what technology is available in the data center to achieve the target parameters; and c) determine a total heat load in the data center $P_{HL}$ based on a power consumption of information technology equipment in the data center $P_{IT}$, data center area $A_{DC}$, miscellaneous power consumption in the data center $P_{MIS}$, a number of required air conditioning units in the data center $\#_{req}^{ACU}$, a blower power for each of the air conditioning units $P_{blower}^{ACU}$, a power distribution loss factor $f_{PDU}$, a power for lighting factor $f_{light}$ and a factor accounting for amount of power consumed for humidity control $f_{ACU}$ as: $P_{HL}=P_{IT}(1+f_{PDU})+A_{DC}f_{light}+P_{MIS}+\#_{req}^{ACU}P_{blower}^{ACU}(1+f_{ACU})$;

d) determine an optimum data center efficiency given the target parameters for the data center, the technology pre-requisite parameters for the data center, and the total heat load, wherein real-time values for power consumption in the data center and real-time values for environmental conditions outside of the data center are used for determining one or more of the target parameters for the data center and the technology pre-requisite parameters for the data center, wherein air conditioning units are present in the data center which receive chilled water from a chiller, and wherein the optimum data center efficiency is determined based in part on a chiller power consumption in the data center which is a sum of two components: i) power dissipation associated with running the chiller and ii) a total heat load in the data center multiplied by a chiller facto that represents a percentage of the total heat load for a given data center used for pumping the chilled water, and repeat steps a-d at a predetermined time interval that is set to coincide with fluctuations in the environmental conditions outside of the data center.

\* \* \* \* \*